May 15, 1962 N. J. RADZIWON 3,034,401
SPECTACLE FRAME
Filed Aug. 22, 1960

INVENTOR.
NORMAN J. RADZIWON
BY
Frank C. Parker
ATTORNEY 3,034,401
SPECTACLE FRAME
Norman J. Radziwon, Irondequoit, N.Y., assignor to Bausch & Lomb Incorporated, Rochester, N.Y., a corporation of New York
Filed Aug. 22, 1960, Ser. No. 50,943
3 Claims. (Cl. 88—41)

This invention relates to an ophthalmic mounting which is composed of metallic frame parts whereon non-metallic decorative browpieces are mounted, and more particularly it relates to improvements in means for connecting said browpieces to the metallic frame.

It is an object of this invention to provide novel structure for spectacles having a frame made of metal and having a decorative structure therefor which is made of easily formed material such as thermosetting plastic resins.

A further object is to provide such a device wherein the functionally stressed parts are made of strong metal and only the decorative parts are made of plastic compounds, the attachment or joining means between the metal and plastic parts being strong and reliable, and furthermore being concealed for good appearance.

A further object is to provide such a device wherein said decorative browpieces may be simply and effectively interchanged on said metallic frame without the use of special tools, the labor and material costs therefore being advantageously low.

Further objects and advantages will be apparent in the novel details of construction and arrangement of parts of this invention by referring to the specification herebelow taken in connection with the accompanying drawing wherein.

Figure 1:
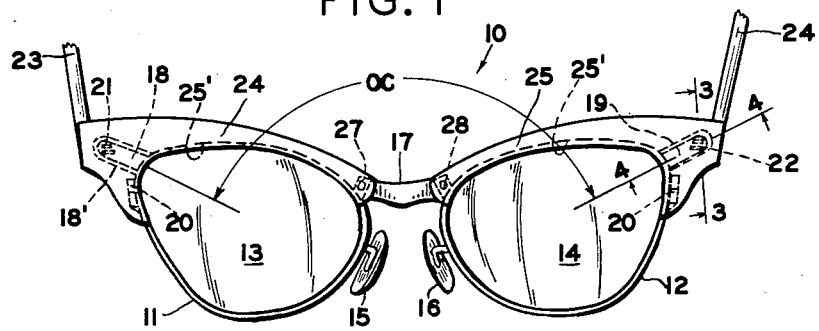
FIG. 1 is a front elevation of a spectacle frame embodying a preferred form of my invention.

As shown in FIG. 1 of the drawing, a spectacle frame is designated generally by the numeral 10 comprising a pair of rim parts 11 and 12 which extend peripherally around a pair of ophthalmic lenses 13 and 14, the rim parts thereof being split at the temporal sides. The split ends of the rim parts 11 and 12 have a lug structure 20 formed thereon wherein a suitable screw 20′ may be threaded to hold the split ends of the rim parts in assembled alignment with each other in the usual manner. Conventional nosepieces 15 and 16 are fixed in any preferred manner such as welding or soldering to the nasal sides of said rim parts to support said spectacle frame in position on the nose of the wearer and a bridge member 17 is suitably fixed to the nasal portions of the rims to unite the rim parts 11 and 12 in spaced relation to each other. In the upper and outer portion of the rims 11 and 12 are fixed, in any suitable manner, a pair of outstanding lugs or hinge plates 18 and 19 which carry temple hinge structure 21 and 22 whereon a pair of temple parts 23 and 24 are hingedly mounted.

Along the top portion of the rims 11 and 12 are provided a pair of non-metallic decorative browpieces 24 and 25 which have grooves 25′ formed in their undersides to receive and conceal the upper section of said rims, said browpieces extending from said bridge outwardly over the temporal parts of said rims. The inner terminal ends of said browpieces 24 and 25 are preferably secured to the bridge member 17 by providing slots 27 in the nasal ends of the browpieces so that these ends will slip over the bridge member 17. In order to secure the browpieces to the opposite sides of the bridge 17, a screw or pin 28 of any desired construction is inserted through proper apertures in the browpieces and engaged in tapped holes in opposite sides of the bridge. Each of the browpieces is enlarged in its temporal portion so as to accommodate the hinge plates 18 and 19.

Figure 3:
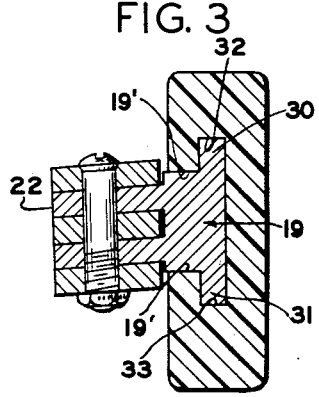
FIG. 3 is a sectional view taken on the line 3—3 of FIG. 1.
Figure 2:
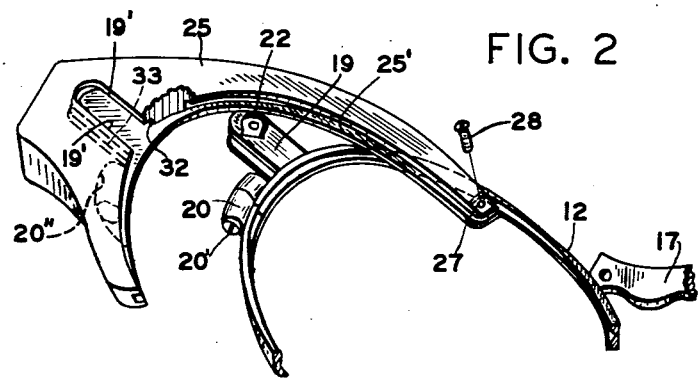
FIG. 2 is an exploded view in perspective of certain details of my invention, parts of which are broken away and shown in section.

According to this invention, means are provided for demountably securing the temporal portions of said browpieces to said hinge plates 18 and 19 by a sliding connection. As best shown in FIGS. 2 and 3, said means preferably comprise key-like projections which are formed longitudinally along the opposite parallel edges of the elongated hinge plates 18 and 19. These key-like projections 30 and 31 may be of any desired cross-sectional shape, such shapes being, for example, square cornered keys or ribs or flanges, as shown in FIG. 3, as well as round edged ridges, or dovetail-like angular projections extending along the sides of the plates 18 and 19. It is especially necessary that each ridge or projection 30 or 31 be located deep in the browpiece and that the ridges have a greater span than the width of the hinge plates.

Figure 4:
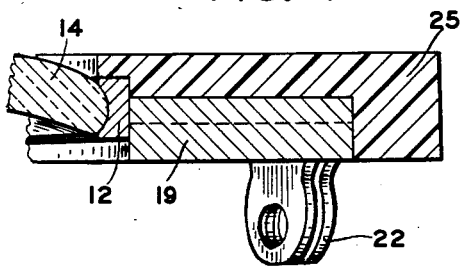
FIG. 4 is a sectional view taken on the line 4—4 of FIG. 1.

For this purpose the browpieces are provided in the location of the hinge plates 18 and 19 with accommodating recesses 18′ and 19′ having parallel opposite walls 32 and 33 which are indented at the bottom with lateral grooves which closely fit and are slidably engaged with the key-like extensions 30 and 31 on the hinge plates. It will be noted from FIGS. 3 and 4 that the hinge plate is entirely concealed by the browpieces and said browpieces may be inserted in their assembled position by engaging said plates in the recesses 18′ and 19′ and sliding them into assembled position.

Another desirable feature of this invention is the orientation of the hinge plates 18 and 19 so that these plates extend in a direction which substantially bisects the ophthalmic lenses 13 and 14, as shown in FIG. 1. By this construction the browpieces 24 and 25 may always slide into assembled position in such a direction that no springing or distorting of the browpieces is experienced due to misalignment or the stress of accommodating to odd shapes. The orientation angle α between the inclined median axes of the hinge plates 18 and 19 may vary according to the specific different peripheral shapes of the lenses 13 and 14 and usually the most favorable angle α is approximately 140°. Suitable open-sided recesses 20″ are provided in the inner surface of the browpieces for receiving the lug structure 20.

In assembling spectacles made according to this invention starting with the metal frame having the lenses 13 and 14 assembled therein, the temple pieces 24 and 25 are assembled in the usual manner to the hinge structure 21 and 22 of the hinge plates 18 and 19. The browpieces are then engaged by mating the recesses 32 and 33 of the browpieces with the keying structure 30 and 31 and the browpieces are then shoved into fully assembled position. Then with the browpieces fully engaged in assembled position, the pins or screws 28 may be inserted to lock the browpieces demountably in place.

It will be seen that there is here provided a decorative browpiece anchorage structure for metal rimmed spectacles, said anchorage structure being fully effective for different kinds and shapes of browpieces and reliably secured to said metal parts so as to withstand rough usage. It will also be perceived that these browpieces so constructed and anchored are easily demountable and replaceable without use of special tools and that the other stated objects of this invention have been fully met.

Although but a single preferred embodiment has been shown and described in detail, it is to be understood that various modifications and changes may be made in the structure and arrangement of the parts thereof without departing from the spirit of the invention as claimed herebelow.

What is claimed is:

1. In an ophthalmic mounting having a pair of lens rims which are joined together integrally by a bridge, a decorative browpiece positioned over the top and temporal sides of each of said rims, and attachment means therefor constructed cooperatively on the adjacent nasal ends of the browpieces and said bridge, the combination of means for demountably securing the temporal side of said browpiece to said rims, said means including a hinge mounting plate whereon a hinge part is formed, said plate being fixed to the temporal part of one of said rims and extending substantially radially outwardly therefrom and whereon a temple is fixed, a pair of key-like projections formed parallel to each other along the side edges of said plate and contiguous to its front side so that the transverse width of the plate at the front side is greater than said width across the rear side, and a pair of parallel walls defining a recess in said browpiece wherein said plate is slidably fitted, the recess having the transverse shape of said plate whereby said browpiece is easily demountable per se for interchanging with similar browpieces having other decorative motifs, the browpiece being locked thereon by the aforesaid attachment means.

2. Separable means for securing a decorative browpiece demountably onto an ophthalmic mounting having a temple hinge mounting plate projecting from and fixed to the temporal portion of a lens rim wherein the browpiece extends along the top and temporal sides of said lens rim, said means comprising a pair of parallel sidewardly projecting ridges which are formed along two opposite longitudinal edges of said plate near to the front surface thereof, the transverse dimension across said ridges being larger at the front surface than the transverse dimension across the remainder of said plate, and a pair of parallel walls shaped to conform to and slidably fit against the sides of said parallel ridges, said walls being the sides of a slot in the browpiece wherein said plate is slid during assembly of the browpiece.

3. An ophthalmic mounting as set forth in claim 1 wherein said key-like projections are constructed to provide a pair of overhanging ledges and said walls are formed with two undercut portions which are slidably fitted around and beneath the ledge portions of said projections to retain the browpiece on said hinge plate.

References Cited in the file of this patent

UNITED STATES PATENTS

| | | |
|---|---|---|
| 2,703,036 | Splaine | Mar. 1, 1955 |
| 2,748,655 | Rohrbach | June 5, 1956 |
| 2,832,261 | Stegeman | Apr. 29, 1958 |

FOREIGN PATENTS

| | | |
|---|---|---|
| 870,078 | France | Dec. 5, 1941 |